United States Patent [19] [11] 4,312,222
Leunig [45] Jan. 26, 1982

[54] APPARATUS FOR TESTING THE VOLUME OF FLUID MEDIUM FLOWING THROUGH VARIABLE CROSS-SECTION THROTTLE

[75] Inventor: Ernst Leunig, Wolfsburg, Fed. Rep. of Germany

[73] Assignee: Volkswagenwerk Aktiengesellschaft, Wolfsburg, Fed. Rep. of Germany

[21] Appl. No.: 116,459

[22] Filed: Jan. 29, 1980

[30] Foreign Application Priority Data

Jul. 3, 1979 [DE] Fed. Rep. of Germany ....... 2926787

[51] Int. Cl.3 ................................................ G01F 9/00
[52] U.S. Cl. ....................................................... 73/118
[58] Field of Search ............................ 73/3, 118, 168

[56] References Cited

U.S. PATENT DOCUMENTS 3,469,442 9/1969 Brueckner ............................. 73/118
4,041,777 8/1977 Leunig et al. ......................... 73/118
4,122,707 10/1978 Leunig ................................. 73/118

*Primary Examiner*—Herbert Goldstein
*Attorney, Agent, or Firm*—Brumbaugh, Graves, Donohue & Raymond

[57] ABSTRACT

This invention is an apparatus for testing the volume of a fluid medium flowing through a variable cross-section throttling point, such as the air throttle duct of a carburetor for an internal combustion engine. The fluid medium to be tested enters a primary duct of the present invention which has an input pressure regulator followed by two constant cross-section nozzles through which the fluid medium must pass. A flow branch duct which includes a second pressure regulator and the flow device intersects the primary duct for fluid transmission at a point between the two nozzles. The second pressure regulator is at the input to the test device. A pressure gauge is provided at the intersection of the main duct and branch duct. The indicated pressure is inversely proportional to the fluid flow volume through the test device.

3 Claims, 1 Drawing Figure

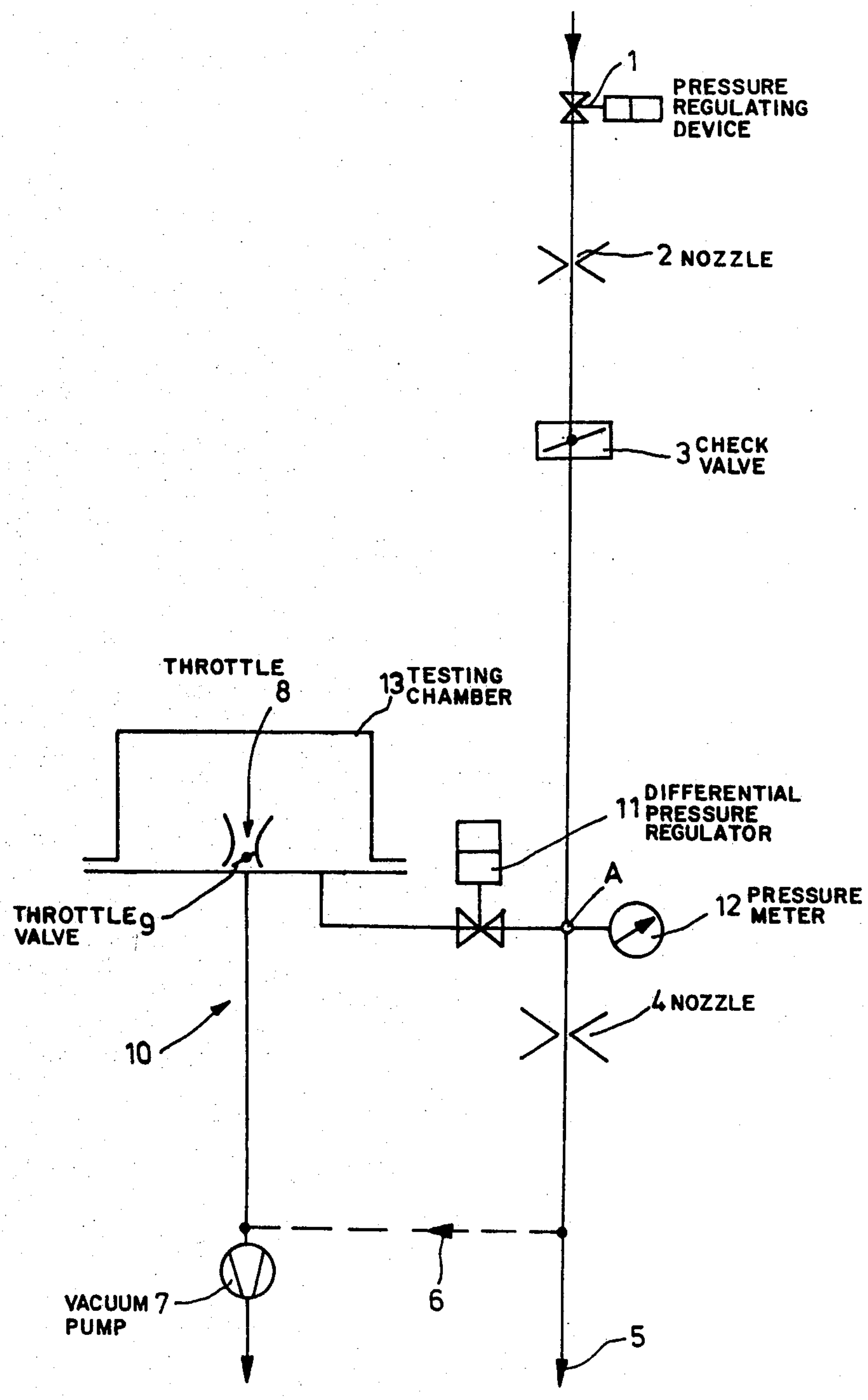
1
PRESSURE
REGULATING
DEVICE
2 NOZZLE
3 CHECK
VALVE
THROTTLE
8
13 TESTING
CHAMBER
11 DIFFERENTIAL
PRESSURE
REGULATOR
A
12 PRESSURE
METER
THROTTLE
VALVE 9
4 NOZZLE
10
VACUUM
PUMP 7
6
5

APPARATUS FOR TESTING THE VOLUME OF FLUID MEDIUM FLOWING THROUGH VARIABLE CROSS-SECTION THROTTLE

BACKGROUND OF THE INVENTION

The present invention relates to an apparatus for continuously measuring the flow volume of a fluid medium especially air, which passes through a variable cross-section throttling point, such as the air throttle of a carburetor for an internal combustion engine.

Methods are known, such as described in German Pat. No. 2,311,484, dated Oct. 3, 1974, for testing the volume flow of a fluid medium at a variable cross-section throttle point, including the air supply metering device for electronic fuel injection engines arranged in series. The throttle to be tested is between two constant cross-section test nozzles. One of the nozzles is located upstream of the throttle, and provides a constant flow volume of air. The second nozzle, located downstream of the throttle to be tested, maintains constant pressure of the medium at the outlet of the throttle, and is not in any way related to the measurement of the flow volume. Such constant outlet pressure may alternatively be provided by use of a vacuum pump arranged downstream of the throttle.

According to the known methods, the fluid pressure at a point between the first nozzle and the test throttle is measured and compared to a calibration fluid pressure value associated with a sample throttle. From this comparison it is determined whether the measured fluid pressure corresponds to the required fluid pressure value associated with that fluid volume for the sample throttle.

Difficulties occur in the known method of testing the fluid flow volume at a throttling point, as described above, when the throttling point has a variable cross-section, such as the air throttle of a carburetor. In that case, every different throttle setting has a different cross-section area through which the fluid medium must pass. As a result of the change in the throttle, it is necessary to change the cross-section of the first nozzle to correspond to different throttle settings. This has been accomplished by providing either a plurality of nozzles upstream of the throttle point to be tested or by providing nozzles having calibrated variable cross-sections.

It is therefore an object of the present invention to provide a new and improved apparatus for testing the fluid flow volume passing through a variable cross-section throttle accurately and without the need for repetitious calculations or for equipment having multiple configurations.

SUMMARY OF THE INVENTION

In accordance with the present invention, there is provided an apparatus for testing the flow volume of a fluid medium, e.g., air, flowing through a variable cross-section throttling point, such as the air throttle of a carburetor for an internal combustion engine. The apparatus has a primary duct into which the medium to be tested is introduced and which duct includes a means for maintaining constant inlet pressure at the point at which the fluid enters the duct. There are provided two constant cross-section test nozzles provided along the primary duct at points downstream from the inlet. At a point between the two nozzles, a branch duct intersects the primary duct. The branch duct includes the throttle device to be tested and means for maintaining constant pressure at the inlet of the throttle device under test. Finally, there is provided means for measuring the pressure of the fluid at the intersection of the primary duct and the branch duct, so that any change in the volume of fluid mediums allowed to pass through the apparatus as a result of a variation of the throttle cross-section is indicated by the pressure measuring means as a pressure variation.

Another embodiment of the present invention includes a third means for maintaining constant pressure of the fluid medium downstream of the throttle. As a variation of this configuration the outlet of the second constant cross-section nozzle may also be connected to the inlet of the third means for maintaining pressure.

As a result of the present invention only two constant cross-section nozzles are required neither one of which must have a calibrated variable cross-section. Furthermore, since the relationship between volume of the medium passing through the throttle and the pressure of the fluid medium measured at the intersection of the primary duct and the flow branch duct is direct, the measuring device can be calibrated to directly read fluid flow through the throttle.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

The FIGURE is a schematic diagram showing an apparatus in accordance with the present invention.

DETAILED DESCRIPTION OF THE INVENTION

The test nozzles used in the present invention are critical flow sonic nozzles wherein the fluid, e.g., air, flowing through the nozzle achieves sonic velocity near the center of the flow cross-section. The volume of fluid flowing through such nozzles depends only on the pressure and temperature of the inlet air, as well as a jet constant. For constant temperature input fluid and an outlet pressure lower than one-half the input pressure, the flow volume is proportional to the input pressure.

Referring to the drawing, a fluid medium, i.e., air, is introduced by means of a pressure regulating means 1 into the main duct of the configuration shown, which includes constant cross-section nozzles 2 and 4, and a check valve 3. After flowing through the second nozzle 4, the air may pass directly out of the apparatus, shown by path 5, or, according to one alternative, may be conveyed over transfer duct 6 to the inlet of a vacuum pump 7, which is primarily intended as a means for maintaining the air pressure constant downstream of the tested throttle 8—in this case the air throttle of a carburetor having an air throttle valve 9.

The throttle 8 to be tested is located in a branch duct 10, which also includes a differential pressure regulator 11, and is arranged for fluid transmission in series with the first nozzle 2, but in parallel with the nozzle 4.

At the inlet of the branch duct 10 a pressure measuring device is located which measures the air pressure at a point A. The pressure at point A is proportional to the volume of the air flow through nozzle 4, which is the difference between the volume of air flowing in through nozzle 2, which is maintained constant, and the unknown volume of flow through the test throttle 8. By means of the differential pressure regulator 11, the pressure of the medium at the throttle point 8, and also, therefore, at the inlet to the testing chamber 13, is set to a predetermined constant value, which is independent of the pressure of the medium at point A. Due to the constancy of the volumetric flow of the medium through nozzle 2, the pressure at point A—as indicated by means of pressure measuring device 12—is inversely proportional to the volumetric flow of the medium through throttle point 8 which, in turn, depends upon the position of the throttle valve 9.

Thus, the present invention allows the continuous measurement of fluid flow volume through a variable cross-section throttle by measuring only one quantity, the pressure of the medium at a point A, while at the same time, requiring only two constant volume nozzles 2 and 4. The pressure meter 12 can be calibrated or provided with a special face for direct reading of flow volume without calculation or calibration.

Vacuum pump 7 may be arranged at the output of the test throttle to provide lower output pressure as required by various test conditions. If required, the vacuum pump may also be used to provide lower output pressure for nozzle 4 by branch duct 6.

The testing, in accordance with the present invention, is completed by determining whether the volumetric flow of the medium through the varying cross-sectional area of the throttle point, as measured by way of the pressure in point A, corresponds to the prescribed flow value.

While there have been described what is believed to be the preferred embodiment of the invention, those skilled in the art will realize that changes and modifications may be made thereto without departing from the spirit of the invention, and it is intended to claim all such changes and modifications as fall within the true scope of the invention.

I claim:

1. An apparatus for measuring the volume of a fluid medium flowing through a variable cross-section device having an inlet and an outlet under test, comprising;

(a) a primary fluid duct having an inlet;

(b) a first constant cross-section nozzle at said duct inlet providing a constant rate of flow of said medium therethrough;

(c) a second constant-cross section nozzle in said primary duct downstream from said nozzle maintaining a constant pressure of said medium at the outlet of said device under test;

(d) a branch duct intersecting said primary duct between said first and second nozzles and connected to the inlet of said test device;

(e) a fluid pressure regulator in said branch duct, for regulating the pressure input to said device and means for measuring fluid pressure at said intersection of said primary duct and said branch duct;

whereby the volume of said medium flowing through said device under test can be determined from said measured fluid pressure.

2. An apparatus as described in claim 1 wherein there is provided means for maintaining constant fluid outlet pressure to said device under test.

3. An apparatus as described in claim 2 wherein the outlet of said second nozzle is connected to said outlet pressure maintaining means.

* * * * *